C. H. CHANDLER.
PLATING.
APPLICATION FILED JUNE 26, 1919.
1,373,488.
Patented Apr. 5, 1921.
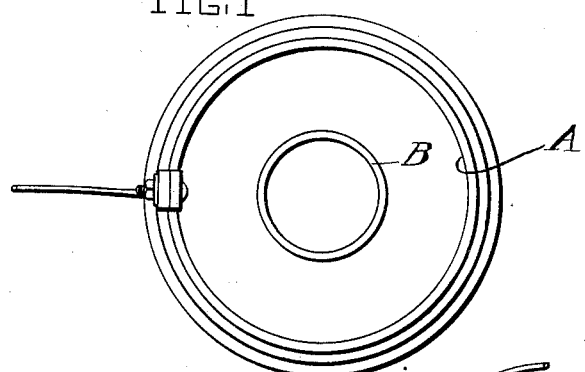
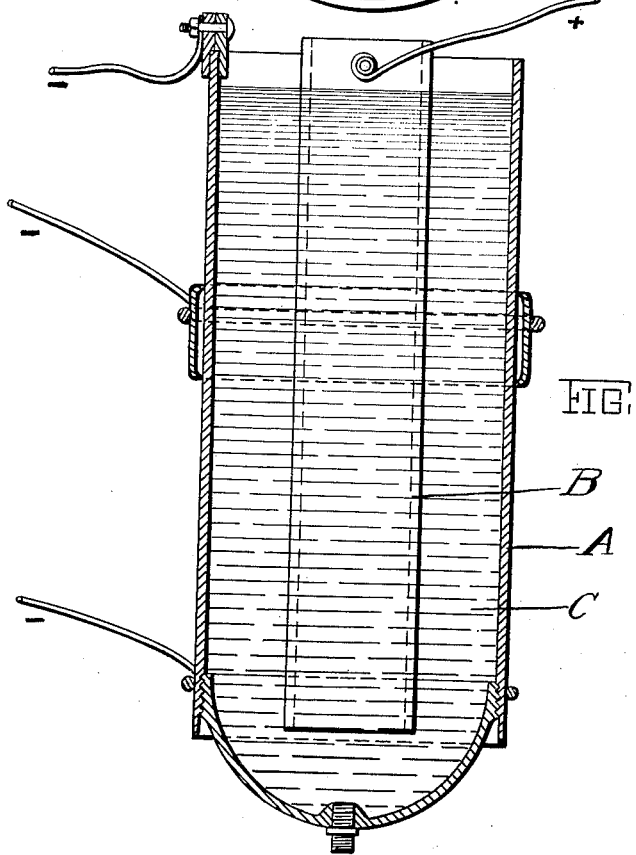
INVENTOR.
Charles H. Chandler
BY
ATTORNEY.

UNITED STATES PATENT OFFICE.

CHARLES H. CHANDLER, OF NEWPORT, RHODE ISLAND.

PLATING.

1,373,488.      Specification of Letters Patent.      Patented Apr. 5, 1921.

Application filed June 26, 1919. Serial No. 307,000.

*To all whom it may concern:*

Be it known that I, CHARLES H. CHANDLER, a citizen of the United States, residing at Newport, county of Newport, State of Rhode Island, have invented certain new and useful Improvements in Plating, of which the following is a specification.

This invention relates to plating and particularly to the depositing from an electrolyte of solder as a coating or skin on metal vessels or other objects subjected by their usage to rust or corrosion.

In my previous application No. 223,817, filed March 21, 1918, I discussed particularly plating with lead. In some instances, even in the plating of a torpedo flask, referred to in my prior application, it has been deemed desirable to secure a solder plating.

The difficulty heretofore with electrolytically depositing more than one metal at the same time has been in the tendency of the metal constituents to separate and deposit in layers instead of in characteristic combination as in the case of solder. In accordance with my invention, however, I am able to deposit solder without separation and with the same successful results as accomplished in depositing lead. Preferably the solder is an alloy of lead and tin. I am therefore able to line or coat extensive surfaces with a smooth fine solder skin.

For the purposes of illustration I have shown in the drawings a flask similar to that employed as an illustrative embodiment in my preceding application.

Figure 1 is an elevation, and

Fig. 2 is a transverse section.

In coating such a flask as indicated at A I suspend within it my usual hollow cylindrical anode B of lead tin alloy.

My electrolyte C is preferably of high free acidity as this effects a more firmly deposited coating. The best results seem to be secured between 8% and 16% high free hydrofluosilicic acid.

I preferably start my electrolyte as a lead fluosilicate solution which I build up from white lead and hydrofluosilicic acid. The first deposit with such an electrolyte will be pure lead, but as the cathode is drawn upon, the electrolyte builds up with the alloy and the deposit on the cathode gradually increases in tin until finally the deposit is a solder deposit similar to the proportions in the anode. This seems to be advantageous both from the view point of economy and in the firmness of the deposit.

I am able to vary percentage of solder or alloy from three per cent up and the percentage of free hydrofluosilicic acid may also be varied. The forms in which my invention may be practised are also variable but within the limits of the appended claims, are to be understood as within the scope of my invention.

What I therefore claim and desire to secure by Letters Patent is:

1. The method of lining a torpedo flask or the like, consisting in gradually electrolytically depositing on it as a cathode a progressive increasing alloy of lead and tin as a dense coating from an electrolyte progressively built up from a lead salt of hydrofluosilicic acid and a solder anode.

2. The method of coating a metallic body consisting in gradually electrolytically depositing on it as a cathode, a solder skin from an electrolyte consisting of a lead tin salt of hydrofluosilicic acid.

3. The method of coating a metallic body consisting in gradually electrolytically depositing on it as a cathode a solder skin from an electrolyte consisting of a lead salt of hydrofluosilicic acid and a solder anode suspended therein.

4. The method of coating a metallic body consisting in connecting it electrolytically as a cathode with a solder anode in an electrolyte initially consisting of a lead salt of hydrofluosilicic acid.

In testimony whereof I affix my signature in presence of two witnesses.

CHARLES H. CHANDLER.

Witnesses:
    W. H. DUDLEY,
    JESSIE R. DUDLEY.